(12) United States Patent
Steinbrunner et al.

(10) Patent No.: US 10,515,237 B2
(45) Date of Patent: *Dec. 24, 2019

(54) TAG READER WITH DIAGNOSTIC TAG AND AN INDUSTRIAL VEHICLE INCORPORATING THE SAME

(71) Applicant: Crown Equipment Corporation, New Bremen, OH (US)

(72) Inventors: Cole Steinbrunner, New Bremen, OH (US); Thomas L. Mallak, Spencerville, OH (US); Donald T. Meiring, Osgood, OH (US); Daniel D. Walton, Marysville, OH (US); Nicholas J. Sherman, Minster, OH (US); James Michael Grannan, St. Marys, OH (US)

(73) Assignee: Crown Equipment Corporation, Dayton, OH (US)

( * ) Notice: Subject to any disclaimer, the term of this patent is extended or adjusted under 35 U.S.C. 154(b) by 49 days.

This patent is subject to a terminal disclaimer.

(21) Appl. No.: 15/782,202

(22) Filed: Oct. 12, 2017

(65) Prior Publication Data

US 2018/0039799 A1    Feb. 8, 2018

Related U.S. Application Data

(63) Continuation-in-part of application No. 15/148,634, filed on May 6, 2016, now Pat. No. 9,818,003.
(Continued)

(51) Int. Cl.
*G06K 7/00*   (2006.01)
*G06K 7/10*   (2006.01)
*B66F 9/075*  (2006.01)

(52) U.S. Cl.
CPC .......... *G06K 7/0095* (2013.01); *B66F 9/0755* (2013.01); *G06K 7/10366* (2013.01)

(58) Field of Classification Search
CPC ............ G06K 7/0095; G06K 7/10366; G06K 2017/0045; B66F 9/0755
See application file for complete search history.

(56) References Cited

U.S. PATENT DOCUMENTS 3,922,678 A   11/1975 Frenkel
4,336,449 A   6/1982 Perry
(Continued)

FOREIGN PATENT DOCUMENTS

CN   1871782 A   11/2006
CN   101051362 A  10/2007
(Continued)

OTHER PUBLICATIONS

Final Rejection dated Apr. 17, 2018 pertaining to U.S. Appl. No. 15/148,605, 14 pages.
(Continued)

*Primary Examiner* — Thomas D Alunkal
(74) *Attorney, Agent, or Firm* — Dinsmore & Shohl, LLP

(57) ABSTRACT

An industrial vehicle comprising a tag reader, a reader module, and a diagnostic tag, wherein the diagnostic tag is coupled to the industrial truck within a read range of the tag reader. The reader module and the tag reader cooperate to identify the diagnostic tag and individual tags of a tag layout and the reader module discriminates between the individual tags of the tag layout and the diagnostic tag and the individual tags of the tag layout, correlates an identified individual tag of the tag layout with tag data, correlates an identified diagnostic tag with operation of the tag reader, and generates a missing tag signal if the diagnostic tag is not identified or the operation of the tag reader is not within specified operating parameters.

24 Claims, 10 Drawing Sheets

Related U.S. Application Data

(60) Provisional application No. 62/157,865, filed on May 6, 2015, provisional application No. 62/157,863, filed on May 6, 2015.

(56) References Cited

U.S. PATENT DOCUMENTS

| | | |
|---|---|---|
| 4,847,773 A | 7/1989 | Van Helsdingen et al. |
| 5,258,911 A | 11/1993 | Wellman et al. |
| 5,343,145 A | 8/1994 | Wellman et al. |
| 5,686,902 A | 11/1997 | Reis et al. |
| 5,774,876 A | 6/1998 | Woolley et al. |
| 5,804,810 A | 9/1998 | Woolley et al. |
| 5,959,568 A | 9/1999 | Woolley |
| 6,009,357 A | 12/1999 | Wellman et al. |
| 6,040,774 A | 3/2000 | Schepps |
| 6,049,745 A * | 4/2000 | Douglas ............ G05D 1/0261 180/168 |
| 6,089,453 A | 7/2000 | Kayser et al. |
| 6,135,694 A | 10/2000 | Trego et al. |
| 6,366,242 B1 | 4/2002 | Boyd et al. |
| 6,377,888 B1 | 4/2002 | Olch |
| 6,459,966 B2 | 10/2002 | Nakano et al. |
| 6,496,806 B1 | 12/2002 | Horwitz et al. |
| 6,724,308 B2 | 4/2004 | Nicholson |
| 6,799,099 B2 | 9/2004 | Zeitler et al. |
| 6,900,762 B2 | 5/2005 | Andrews et al. |
| 6,963,301 B2 | 11/2005 | Schantz et al. |
| 6,988,667 B2 | 1/2006 | Stewart et al. |
| 7,017,689 B2 | 3/2006 | Gilliland et al. |
| 7,038,573 B2 | 5/2006 | Bann |
| 7,151,979 B2 | 6/2006 | Andersen et al. |
| 7,151,445 B2 | 12/2006 | Medve et al. |
| 7,307,595 B2 | 12/2007 | Schantz et al. |
| 7,439,864 B2 | 10/2008 | Hunt et al. |
| 7,568,547 B2 | 8/2009 | Yamada et al. |
| 7,605,688 B1 | 10/2009 | Seah |
| 7,609,175 B2 | 10/2009 | Porte et al. |
| 7,681,963 B2 | 3/2010 | Sherman et al. |
| 7,688,223 B2 | 3/2010 | Magens et al. |
| 7,734,385 B2 | 6/2010 | Yang et al. |
| 7,755,552 B2 | 7/2010 | Schantz et al. |
| 7,761,210 B2 | 7/2010 | Baginski et al. |
| 7,800,548 B2 | 9/2010 | Baginski et al. |
| 7,818,088 B2 | 10/2010 | Andersen et al. |
| 7,844,505 B1 | 11/2010 | Arneson et al. |
| 7,925,514 B2 | 4/2011 | Williams et al. |
| 7,928,922 B2 | 4/2011 | King |
| 8,031,086 B2 | 10/2011 | Thacher et al. |
| 8,107,446 B2 | 1/2012 | Shoarinejad |
| 8,131,422 B2 | 3/2012 | Jensen et al. |
| 8,184,005 B2 | 5/2012 | Kamel |
| 8,193,903 B2 | 6/2012 | Kraimer et al. |
| 8,195,342 B2 | 6/2012 | Anderson |
| 8,237,563 B2 | 8/2012 | Schatz et al. |
| 8,253,626 B2 | 8/2012 | Schantz et al. |
| 8,255,107 B2 | 8/2012 | Yang et al. |
| 8,295,974 B2 | 10/2012 | Andersen et al. |
| 8,326,451 B2 | 12/2012 | Schantz et al. |
| 8,421,674 B2 | 4/2013 | Riesner |
| 8,457,781 B2 | 6/2013 | Bailey et al. |
| 8,538,692 B2 | 9/2013 | Wurman et al. |
| 8,587,455 B2 | 11/2013 | Porte et al. |
| 8,643,538 B2 | 2/2014 | Schantz et al. |
| 8,648,709 B2 | 2/2014 | Gauger et al. |
| 8,718,860 B2 | 5/2014 | Waltz et al. |
| 8,989,922 B2 | 3/2015 | Jones et al. |
| 9,658,622 B2 * | 5/2017 | Walton ............... G05D 1/0212 |
| 9,818,003 B2 * | 11/2017 | Steinbrunner ...... G06K 7/10366 |
| 2003/0216969 A1 | 11/2003 | Bauer et al. |
| 2005/0065861 A1 | 3/2005 | Bann |
| 2005/0110610 A1 * | 5/2005 | Bazakos ............ G06K 9/00228 340/5.82 |
| 2005/0173525 A1 * | 8/2005 | Polarine ................ G07C 3/08 235/384 |
| 2006/0220876 A1 | 10/2006 | Campero et al. |
| 2006/0271274 A1 | 11/2006 | Saarikivi |
| 2007/0007080 A1 | 1/2007 | Manthey et al. |
| 2007/0069907 A1 | 3/2007 | Magens et al. |
| 2007/0095915 A1 * | 5/2007 | Crooks ............... G06K 7/0008 235/451 |
| 2007/0112620 A1 * | 5/2007 | Johnson ................ G07B 15/00 705/13 |
| 2007/0152823 A1 * | 7/2007 | Hirahara ............ G08B 13/2462 340/572.1 |
| 2007/0164109 A1 | 7/2007 | Ridings et al. |
| 2007/0164863 A1 * | 7/2007 | Himberger ......... G06K 17/0029 340/572.1 |
| 2007/0233304 A1 | 10/2007 | Baginski et al. |
| 2008/0129445 A1 | 6/2008 | Kraimer et al. |
| 2008/0157923 A1 * | 7/2008 | Coty ..................... G01V 15/00 340/10.1 |
| 2008/0180223 A1 | 7/2008 | Cato et al. |
| 2008/0231459 A1 * | 9/2008 | Corder ................... G07C 5/008 340/572.7 |
| 2009/0212103 A1 | 8/2009 | Li et al. |
| 2011/0128163 A1 | 6/2011 | Gilleland et al. |
| 2011/0137489 A1 | 6/2011 | Gilleland et al. |
| 2011/0254667 A1 | 10/2011 | Popescu |
| 2012/0107077 A1 | 5/2012 | Alveteg |
| 2014/0085090 A1 | 3/2014 | Yeo |
| 2014/0240088 A1 | 8/2014 | Robinette et al. |
| 2016/0117899 A1 * | 4/2016 | Chevalier ................ B25H 3/02 340/572.1 |
| 2016/0300083 A1 * | 10/2016 | Ren ..................... G06K 7/0095 |

FOREIGN PATENT DOCUMENTS

| | | |
|---|---|---|
| CN | 103679226 A | 3/2014 |
| CN | 203699123 U | 7/2014 |
| DE | 102008021395 A1 | 10/2009 |
| EP | 901056 A1 | 3/1999 |
| EP | 956523 B1 | 12/2001 |
| EP | 1010046 B1 | 6/2003 |
| EP | 1537439 B1 | 10/2007 |
| EP | 2284636 A2 | 2/2011 |
| EP | 2354877 A1 | 8/2011 |
| EP | 1728757 B1 | 9/2011 |
| EP | 2080731 B1 | 2/2013 |
| EP | 2447203 B1 | 4/2013 |
| FR | 2929934 A1 | 10/2009 |
| GB | 2473957 A | 3/2011 |
| JP | 2006215857 A | 8/2006 |
| JP | 4791481 B2 | 10/2011 |
| KR | 100882897 B1 | 2/2009 |
| KR | 100882898 B1 | 2/2009 |
| WO | 9529456 A1 | 11/1995 |

OTHER PUBLICATIONS

European Patent Application 16 725 300A-1202 Examinees Report dated Oct. 24, 2018 issued by the European Patent Office.
Office Action pertaining to U.S. Appl. No. 15/571,950, dated Jun. 12, 2018.
Bohn et al., "Super-Distributed RFID Tag Infrastructures", Ambient Intelligence, 2004, vol. 3295, 1-12, Springer Berlin Heidelberg.
Ekambaram et al., "SLAC-RF: Simultaneous 3D Localization of Movile Reads and calibration of RFID Supertags", Department of Electrical Engineering and Computer Sciences, University of California at Berkeley, Aug. 18, 2012.
International Search Report and Written Opinion dated Sep. 13, 2016 pertaining to International Application No. PCT/US2016/031186.
International Search Report and Written Opinion dated Jul. 14, 2016 pertaining to International Application No. PCT/US2016/031167.
International Search Report and Written Opinion dated Sep. 6, 2016 pertaining to International Application No. PCT/US2016/031293.
International Search Report and Written Opinion dated Jul. 12, 2016 pertaining to International Application No. PCT/US2016/031278.
Invitation to Pay Additional Fees dated Jul. 20, 2016 pertaining to International Application No. PCT/US2016/031186.

(56) References Cited

OTHER PUBLICATIONS

Invitation to Pay Additional Fees dated Jul. 13, 2016 pertaining to International Application No. PCT/US2016/031293.
Jungheinrich, "Determining the Right Lift Truck Navigation System for Your Very Narrow Aisle (VNA) Warehouse", 2013, Jungheinrich.
Linde Material Handling, "Guidelines for Planning and Setting Up Very Narrow Aisle Warehouses", 3-42, Linde Material Handling GmbH.
Mehmood et al., "Navigation and Interaction in Physical Spaces using RFID Enabled Spatial Sensing", SenSys'07, Nov. 6-9, 2007, Sydney, Australia.
Park et al., "Autonomous Navigation System for Mobile Robot Using Randomly Distibuted Passive RFID Tags", IEICE Trans. Fundamentals, 2010, vol. E93-A, No. 4, 711-719, The Institute of Electronics, Information and Communication Engineers.
Notice of Allowance dated Feb. 1, 2017 pertaining to U.S. Appl. No. 15/148,202, filed May 6, 2016, 29 pages.
U.S. Appl. No. 15/148,605 Office Action dated Apr. 10, 2017 by U.S. Patent and Trademark Office.
Office Action dated May 7, 2019 pertaining to Chinese Application No. 201680036092.6, 11 pgs.

\* cited by examiner

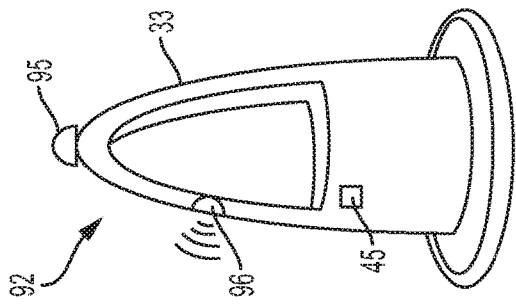
FIG. 7B
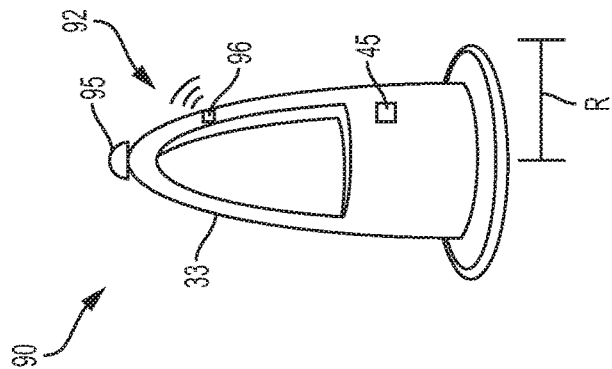
FIG. 7C
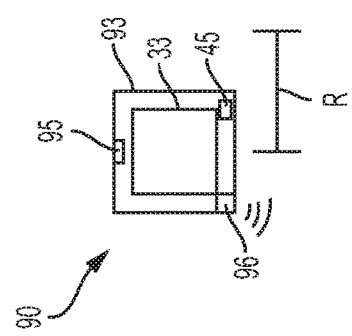
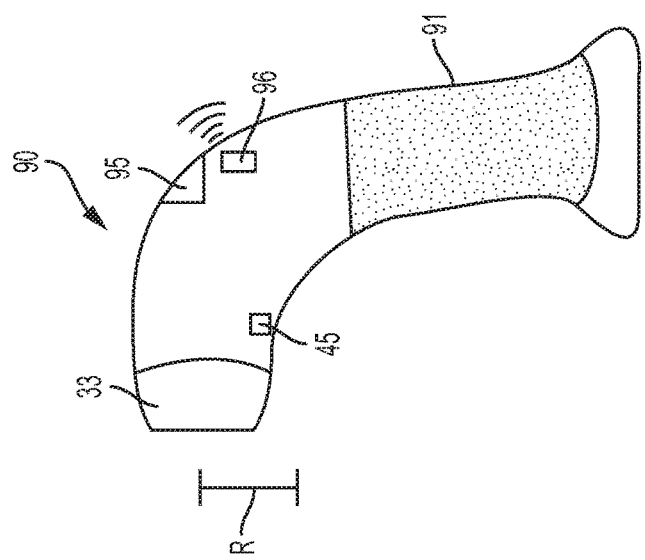
FIG. 7A

TAG READER WITH DIAGNOSTIC TAG AND AN INDUSTRIAL VEHICLE INCORPORATING THE SAME

CROSS REFERENCE TO RELATED APPLICATIONS

The present application is a continuation-in-part of U.S. patent application Ser. No. 15/148,634 filed May 6, 2016, entitled DIAGNOSTIC TAG FOR AN INDUSTRIAL VEHICLE TAG READER, now published as US PG Pub. No. 2016/0328582 A1, which claims priority to U.S. Provisional Application Ser. Nos. 62/157,865, filed May 6, 2015, entitled DIAGNOSTIC TAG FOR AN INDUSTRIAL VEHICLE TAG READER, and 62/157,863, filed May 6, 2015, entitled INDUSTRIAL VEHICLE FOR IDENTIFYING MALFUNCTIONING SEQUENCED TAG AND TAG LAYOUT FOR USE THEREWITH. The entire disclosure of US PG Pub. No. 2016/0328582 A1 is incorporated herein by reference.

BACKGROUND

The present disclosure relates to industrial vehicles and, more specifically, to diagnosing faults with radio frequency identification (RFID) system on the industrial vehicle.

BRIEF SUMMARY

According to one embodiment of the present disclosure, an industrial vehicle comprises a tag reader, a reader module, and a diagnostic tag, wherein the diagnostic tag is coupled to the industrial truck within a read range of the tag reader. The reader module and the tag reader cooperate to identify the diagnostic tag and individual tags of a tag layout and the reader module discriminates between the individual tags of the tag layout and the diagnostic tag and the individual tags of the tag layout, correlates an identified individual tag of the tag layout with tag data, correlates an identified diagnostic tag with operation of the tag reader, and generates a missing tag signal if the diagnostic tag is not identified or the operation of the tag reader is not within specified operating parameters.

According to another embodiment of the present disclosure, a method for identifying a fault in a RFID system comprising a tag reader, a diagnostic tag, and a reader module comprises initializing the tag reader and identifying the diagnostic tag and individual tags of a tag layout through the cooperation of the tag reader and reader module. The method further comprises enabling the diagnostic tag, modulating power to the diagnostic tag such that the diagnostic tag does not interfere with the identification of the individual tags of the tag layout, generating a missing tag signal if the diagnostic tag is not identified while it is enabled or the operation of the tag reader is not within specified operating parameters, and disabling the diagnostic tag if an individual tag of the tag layout is identified.

BRIEF DESCRIPTION OF THE DRAWINGS

The embodiments set forth in the drawings are illustrative and not intended to limit the subject matter defined by the claims. The following detailed description of the illustrative embodiments can be understood when read in conjunction with the following drawings, where like structure is indicated with like reference numerals and in which:

FIG. 7A depicts a RFID reader according to one or more embodiments shown and described herein;

FIG. 7B depicts a RFID gate according to one or more embodiments shown and described herein;

FIG. 7C depicts a RFID entry reader according to one or more embodiments shown and described herein;

DETAILED DESCRIPTION

Figure 1:
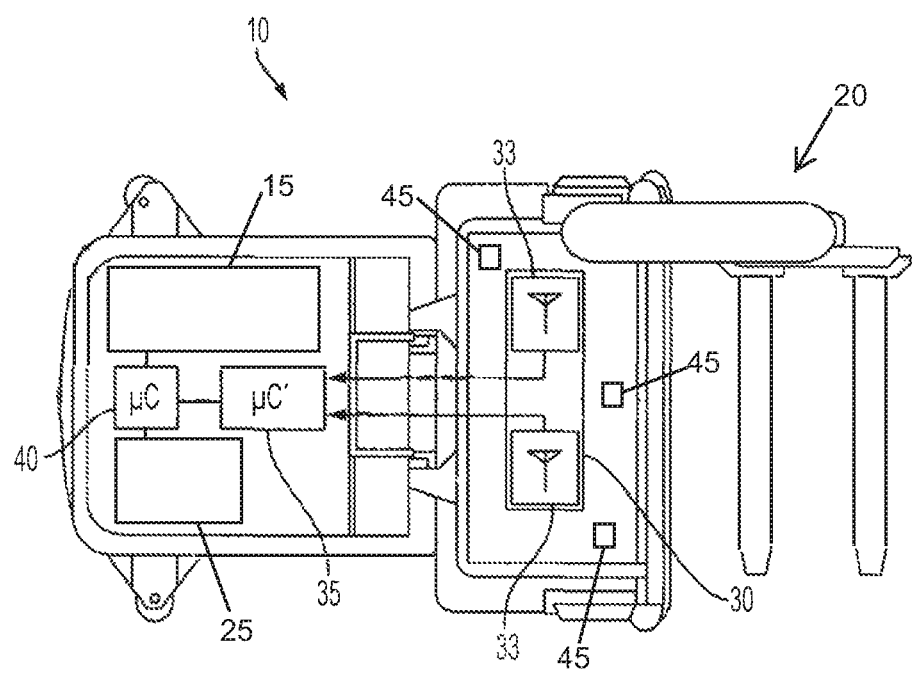
FIG. 1 illustrates an industrial vehicle according to one embodiment of the present disclosure.

FIG. 1 illustrates an industrial vehicle 10 in the form of a lift truck comprising conventional industrial vehicle hardware, e.g., a steering mechanism 15, storage and retrieval hardware 20, and a vehicle drive mechanism 25, the details of which are beyond the scope of the present disclosure and may be gleaned from conventional and yet-to-be developed teachings in the industrial vehicle literature—examples of which include U.S. Pat. Nos. 6,135,694, RE37215, 7,017, 689, 7,681,963, 8,131,422, and 8,718,860, each of which is assigned to Crown Equipment Corporation.

The industrial vehicle's 10 RFID system will typically include the reader module 35 and the tag reader 30. The tag reader 30 is configured to cooperate with the reader module 35 to identify at least one diagnostic tag 45 and one or more tags 5 (FIG. 2A) of a tag layout in an environment such as a building, warehouse, or industrial facility for example. It should be understood that the reader module 35 may be a separate device or part of the tag reader 30. The industrial vehicle 10 further comprises a vehicle controller 40. For example, and not by way of limitation, it is contemplated that the tag reader 30 will be responsive to RFID tags positioned in the vicinity of the industrial vehicle 10. It is contemplated that the RFID tags are exclusively or a combination of passive RFID tags and active a RFID tags. The particular configuration of the reader module 35, the tag reader 30, and the associated RFID tags (hereinafter "tag") to which they are responsive are beyond the scope of the present disclosure and may be gleaned from conventional or yet-to-be developed teachings on the subject—examples of which include U.S. Pat. No. 8,193,903 B2, assigned to Crown Equipment Corporation, and entitled "Associating a transmitter and a receiver in a supplemental remote control system for materials handling vehicles" and U.S. Pat. No. 6,049,745, assigned to FMC Corporation, and entitled "Navigation System for Automatic Guided Vehicle."

The tag reader 30 comprises one or more read antennas 33. Although two are shown in FIG. 1, it should be understood that any number of read antennas 33 are contemplated. It is contemplated that each read antenna 33 reads tags within a read range R (FIG. 2A) (i.e., a distance between a read antenna 33 and a tag at which a signal strength is sufficient for the reader module 30 to identify the tag) and generates respective tag read signals when tags are within the read range of the read antennas 33. If there are two or more read antennas 33, than it is contemplated that the respective read ranges of the read antennas 33 may overlap or be mutually exclusive. If the read ranges of the read antennas 33 overlap, it is contemplated that the tag reader 30 and the reader module 35 are equipped to discriminate between respective tag read signals from the different read antennas 33 and determine which tag read signal from which read antenna 33 is valid. In one embodiment, validity of the tag read signal is determined based on a comparison of a signal strength of a tag read signal by each read antennas 33 with the valid read antenna 33 determined to have the stronger (i.e., greater magnitude) signal strength from the tag. In one embodiment, validity of the tag read signal is determined based upon which read antenna 33 generates the tag read signal first.

The industrial vehicle 10 also comprises at least one diagnostic tag 45. In one embodiment, there is one diagnostic tag 45 within a respective read range for each read antenna 33 on the industrial vehicle 10. In one embodiment, there is one diagnostic tag 45 positioned on the industrial vehicle 10 such that it resides within the read range of every read antenna 33 on the industrial vehicle 10. The reader module 35 discriminates between the individual tags of the tag layout and the diagnostic tag 45 and the individual tags of the tag layout. The reader module 35 correlates an identified individual tag of the tag layout with tag data and an identified diagnostic tag 45 with operation of the tag reader 30.

Figure 8:
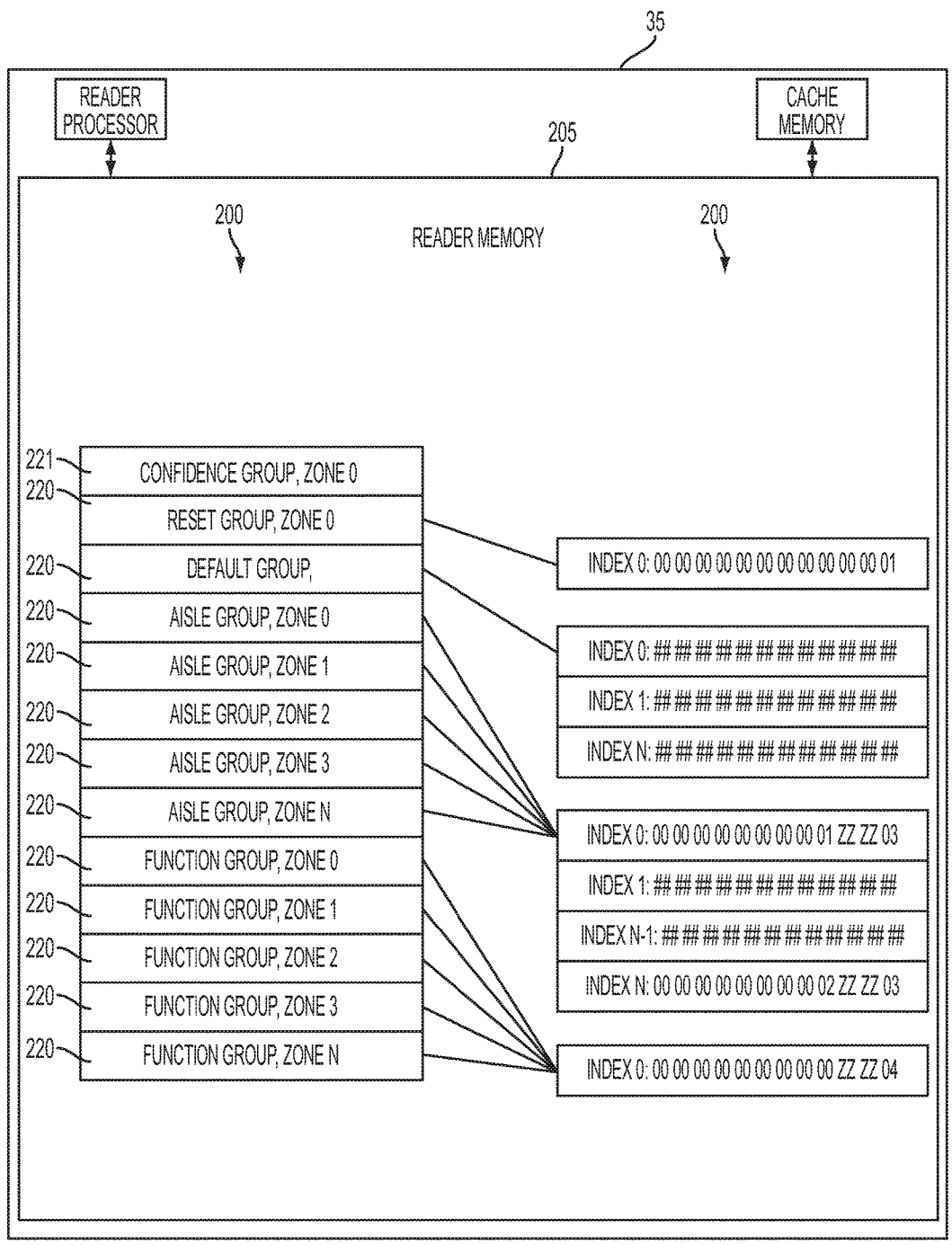
FIG. 8 is a schematic illustration of a reader module according one embodiment of the present disclosure.

Still referring to FIG. 1, it is contemplated that each diagnostic tag 45 comprises a unique identification code which is the subject of the tag read signal generated by the read antennas 33. It is contemplated that the unique identification codes of the one or more diagnostic tags 45 can be stored in memory of the reader module 30 where they will be used to identify each diagnostic tag 45 for the purpose of diagnostics of the tag readers 30. It is also contemplated that the unique identification codes for each diagnostic tag 45 are stored in the memory of the reader module 35 at a location where the reader module 35 may quickly identify each diagnostic tag 45 and enhance the processing speed of the diagnostic routine described in greater detail below. Specifically, and referring to FIG. 8, a Confidence Group 221 corresponds to the unique identification codes for the diagnostic tags and as illustrated, is the first group read in the memory locations 200 of the reader memory 205. The individual tags of the tag layout correspond to data in a reset group 220, a default group 230, one or more aisle zone groups 210, and one or more function zone groups 215. It is the tag read signal which is correlated with the memory locations 200 to identify the confidence tag and the individual tags of the tag layout.

Figure 2:
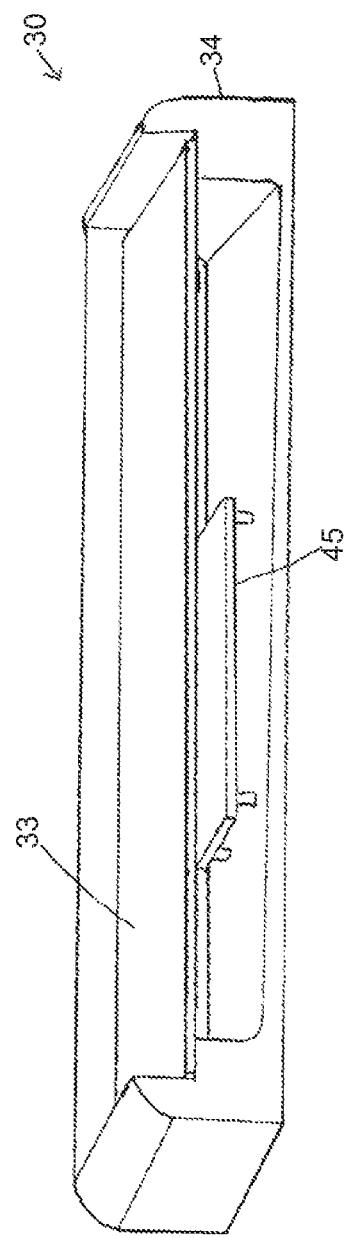
FIGS. 2 and 2A-2C illustrate several embodiments of a spatial relationship between a tag reader and a diagnostic tag according to one or more embodiments shown and described herein.

Referring to FIGS. 1 and 2, the diagnostic tag 45 is coupled to an antenna Frame 34 and transmits a diagnostic signal which is received by a read antenna 33 of the tag reader 30 which in turn is used to generate the tag read signal. The reader module 35 confirms that the diagnostic signal from the diagnostic tag 45 is received and is within normal operating parameters. Normal operating parameters may include, but are not limited to, received signal strength, signal delay, waveform shape, and the like. Example signal strength measurements include, but are not limited to, approximately −45 dB to approximately −50 dB. In some embodiments, it may be preferable to have a signal strength measurement of approximately −30 dB. In all embodiments, the received signal strength of the diagnostic tag 45 is set such that it is above the signal noise of the RFID system but below the received signal strength of the individual tags of the tag layout. As explained in greater detail below, this is so the tag reader 30 can identify tags of the tag layout when the diagnostic tag is active. In other words, so the diagnostic signal does not mask the transmit signals of the individual tags of the tag layout.

Figure 2C:
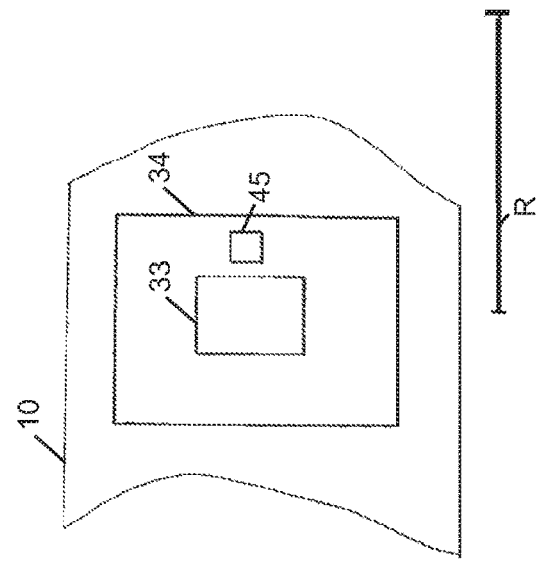
Figure 2B:
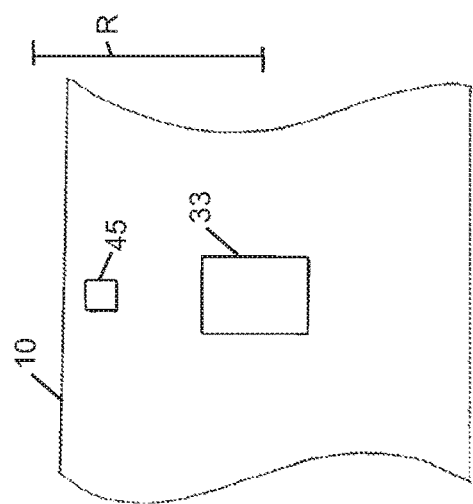
Figure 2A:
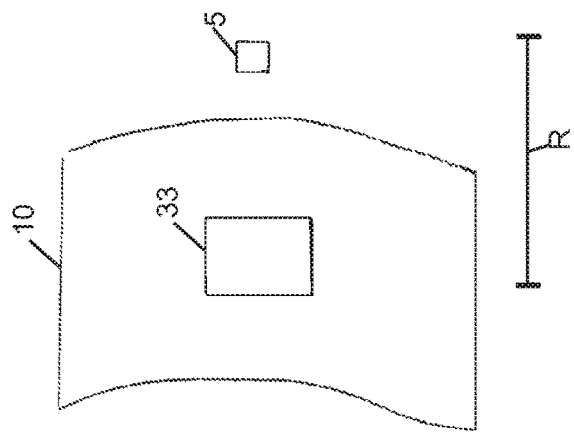

Referring to FIG. 2A, in one embodiment, the tag reader 30 is located within a read range R of a tag 5 of a tag layout. The tag reader 30 is coupled to the industrial vehicle 10 in this embodiment and the tag 5 is within the environment. Referring to FIG. 2B, in one embodiment, a diagnostic tag 45 is mounted to the industrial vehicle 10 within the read range R. Referring to FIG. 2C, in one embodiment, a tag reader 30 may comprise the read antenna 33 and an antenna frame 34. The read antenna 33 and the diagnostic tag 45 are coupled to the antenna frame 34 and the antenna frame 34 is coupled to the industrial vehicle 10. In this embodiment, the diagnostic tag 45 is coupled spatially between the read antenna 33 and the antenna frame 34. Examples of mounting locations on the industrial vehicle 10 include, but are not limited to, the undercarriage, the body, bumpers, the storage and retrieval hardware 20, and/or the protective cage.

Figure 9:
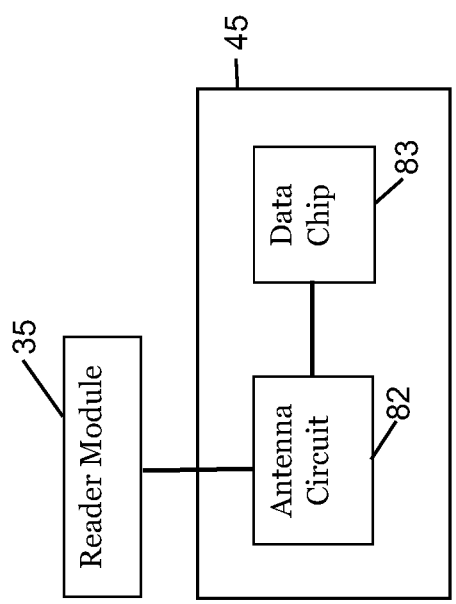
FIG. 9 is block diagram of a diagnostic tag module according one embodiment of the present disclosure.

Referring to FIG. 9, in one embodiment, the diagnostic tag 45 is a passive RFID tag comprising an antenna circuit 82 communicatively coupled to a data chip 83. The reader module 35 is coupled to the antenna circuit 82 and modulates power to the diagnostic tag 45 by applying power (direct current (DC) voltage) to the antenna circuit 82 such that the antenna circuit 82 will not either receive electromagnetic radiation from the tag reader 30 and energize the data chip 83 or transmit the diagnostic signal. It is contemplated that the reader module 35 will apply power to the diagnostic tag 45 to disable the diagnostic tag 45 as explained in greater detail below and will remove power from the diagnostic tag 45 to enable the diagnostic tag 45, thereby allowing the diagnostic tag 45 to behave as a passive RFID tag.

Figure 10:
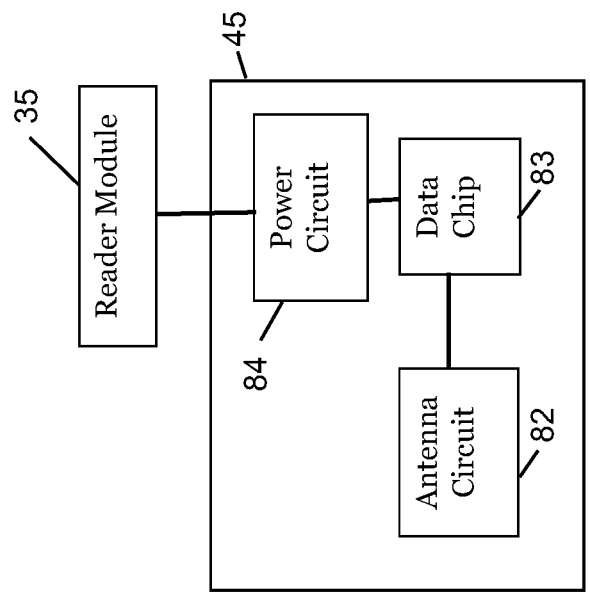
FIG. 10 is a block diagram of another embodiment of the diagnostic tag module according one embodiment of the present disclosure.

Referring to FIG. 10, in one embodiment, the diagnostic tag 45 is an active RFID tag comprising the data chip 83 communicatively coupled to the antenna circuit 82 and coupled to a power circuit 84. The power circuit 84 powers the data chip 83 and the antenna circuit 82 such that the active RFID tag responds to the tag reader 33 with the diagnostic signal. The reader module 35 is coupled to the power circuit 84 such that the reader module 35 powers the diagnostic tag 45 through applying power to the power circuit 84. Therefore, it is contemplated that the reader module 35 will apply power to the power circuit 84 of the diagnostic tag 45 to enable the diagnostic tag 45 and will remove power from the power circuit 84 of the diagnostic tag 45 to disable the diagnostic tag 45 as explained in greater detail below.

Figure 3:
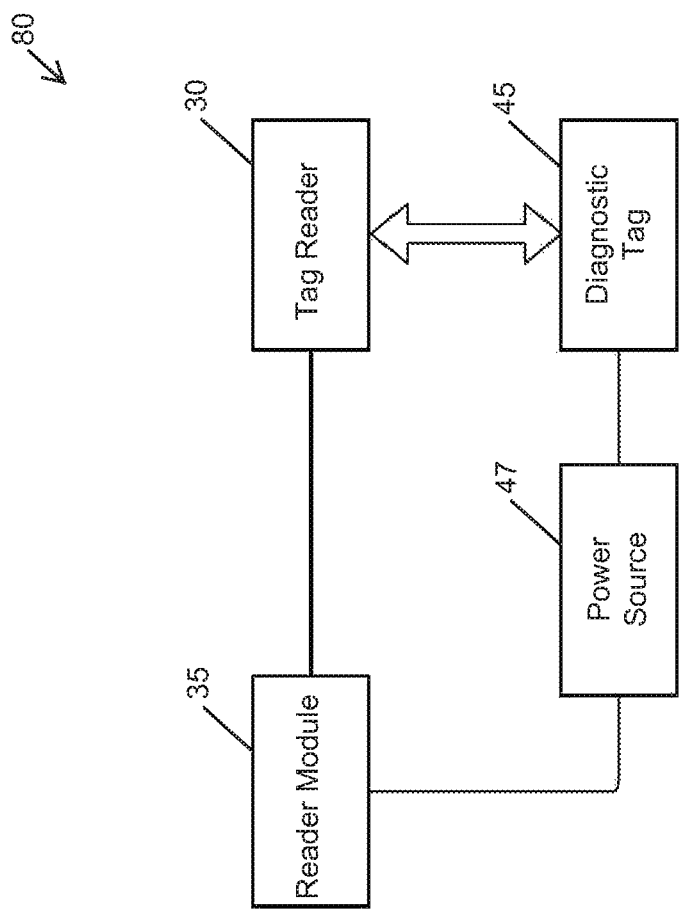
FIG. 3 is a block diagram of a RFID system according to one or more embodiments shown and described herein.

FIG. 3 is a block diagram of a RFID system 80 with a diagnostic tag 45. The diagnostic system 80 comprises the reader module 35, the tag reader 30, a power source 47, and the diagnostic tag 45. The power source 47 is coupled to the reader module 35 and the diagnostic tag 45 and the reader module 35 is coupled to the tag reader 30. The diagnostic system 80 may be active or inactive based on whether power is enabled or disabled to the diagnostic tag 45. In this way, the power to the diagnostic tag 45 may be modulated as explained in greater detail below. The tag reader 30 is communicatively coupled to the diagnostic tag 45. For example, as discussed above, a diagnostic signal transmitted by the diagnostic tag 45 is received by the read antenna such that the tag reader 30 generates a tag read signal. Further, the tag reader 33 may transmit electromagnetic energy of a specified frequency to energize an antenna circuit of a passive RFID diagnostic tag 45 to power it. In one embodiment, the power source is coupled to the vehicle controller 40 (FIG. 1) instead of the reader module 35. In this configuration, the reader module 35 and the vehicle controller 40 cooperate to modulate power to the diagnostic tag 45. In one embodiment, the power source 47 is not present and the reader module 35 powers the diagnostic tag using the power provided to the reader module 35.

Figure 4:
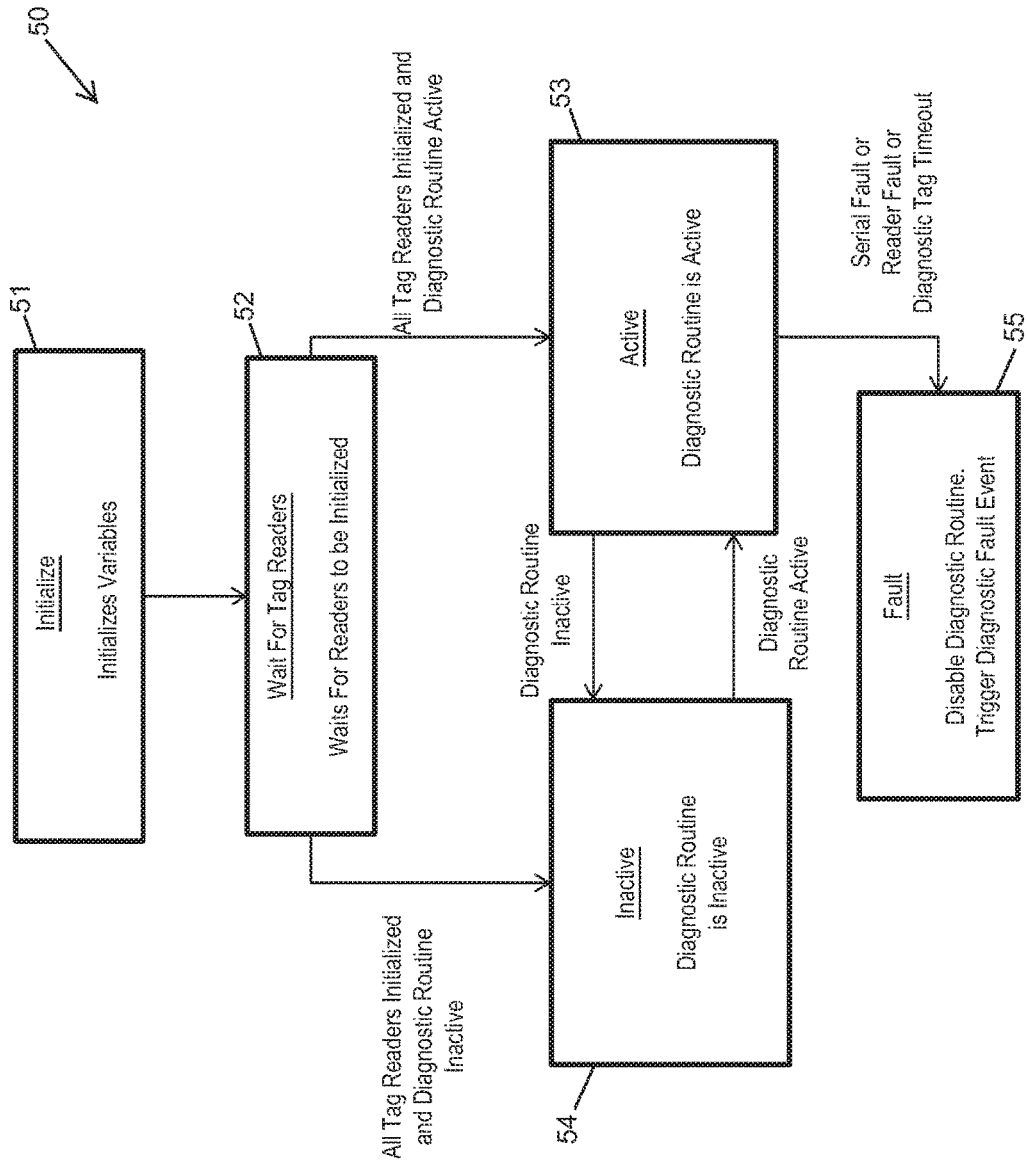
FIG. 4 is a flowchart illustrating a diagnostic routine according to one or more embodiments shown and described herein.

FIG. 4 depicts a diagnostic tag modulation routine 50 utilizing a diagnostic tag for diagnosing the operational state of the tag reader in an RFID system. The diagnostic tag modulation routine 50 starts by initializing 51 the tag readers. The diagnostic tag modulation routine 50 then waits 52 for confirmation that the tag readers are initialized. It is contemplated that confirmation may be provided by the reader module 30 (FIG. 1) or the tag readers 33 (FIG. 1). The next step is to either transition the diagnostic routing 50 to active 53 or inactive 54. The decision to transition between active 53 and inactive 54 is explained in detail below. The diagnostic tag modulation routine 50 may be transitioned as needed between the active 53 and inactive 54 states. If the diagnostic tag modulation routine 50 is inactive 54, the diagnostic tag modulation routine 50 does not look for faults with the RFID system and waits until it is transitioned to the active 53 state. It is contemplated that the diagnostic tag modulation routine 50 may be inactive 54 due to the tag reader identifying tags of a tag layout or the industrial vehicle 10 is shutting down. In the active state 53, the diagnostic tag transmits a diagnostic signal with its unique identification code. The reader module looks for a fault 55, as described hereinafter, in the RFID system.

Figure 5:
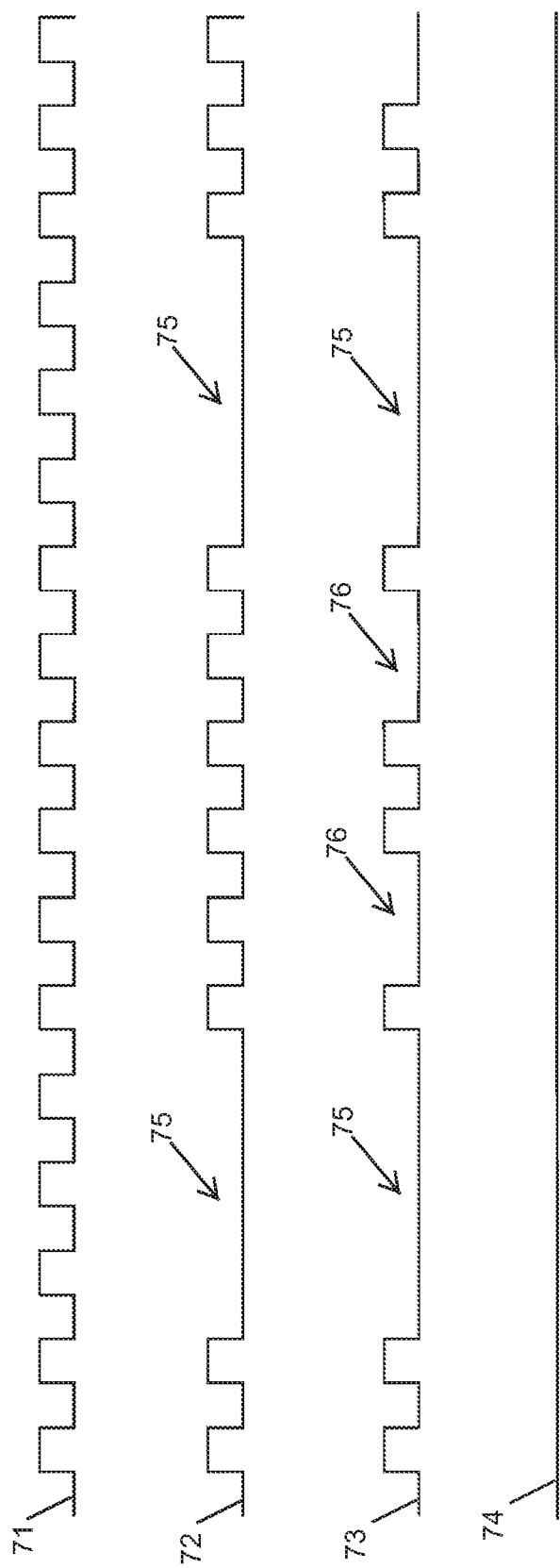
FIG. 5 illustrates modulation waveforms according to one or more embodiments shown and described herein.

FIG. 5 depicts four diagnostic modes 70 for the diagnostic tag: an always on mode 71, a smart mode 72, a smart modulation mode 73, and an always off mode 74. The four diagnostic modes 70 are waveforms of the transmission of the diagnostic signal and relate to whether the diagnostic tag is enabled or disable. It is contemplated that the waveforms may not be transitioned between enabled and disabled at regular intervals as shown in FIG. 5 (square wave) and may be enabled for the duration of time or disabled for the duration of time. In the always on mode 71, the reader module will enable or maintain power to the diagnostic tag such that the diagnostic tag transmits its diagnostic signal at regular intervals. In the always off mode 74, the reader module will disable or remove power from the diagnostic tag such that the diagnostic tag does not transmit its diagnostic signal.

In the smart mode 72, the reader module will disable the diagnostic tag when it receives a tag read signal from the tag reader indicative of a tag which is not the diagnostic tag within the read range of the tag reader. In the smart mode 72, the reader module will disable or remove power from the diagnostic tag for a read interval 75 when the tag reader receives a tag read signal from the tag reader indicative of another tag in the tag layout. It should be understood that the read interval 75 is indicative of the start of the interval and not the duration of the interval. Therefore, the read interval 75 may have a duration last as long as needed until a tag, other than the diagnostic tag, is no longer identified by the tag reader, a delay timer elapses as explained below, or receive a transmitted signal from another tag which is not the diagnostic tag.

It is contemplated that the power to the diagnostic tag may be modulated such that the diagnostic signal transmitted by the diagnostic tag does not interfere with the standard operation of the industrial vehicle and the tag reader or to conserve power. Specifically, the tag reader may be used by the industrial vehicle to identify one or more individual tags in a tag layout in an environment such as a building. The diagnostic tag's transmitted diagnostic signal may interfere with or mask the transmitted signal from the individual tags of the tag layout while in operation. To prevent or at least reduce the likelihood of masking a signal from another tag, the reader module will disable or remove power from the diagnostic tag at periodic or regular intervals 76 to "listen for" another tag as shown in the smart modulation mode 73. When the diagnostic tag is disabled, the reader module will try to identify other tags or wait for a tag read signal from the tag reader which is indicative of a tag, which is not the diagnostic tag. It is contemplated that the smart modulation mode 73 will operate like the smart mode 72 wherein the diagnostic tag is disabled during the read interval 75 in addition to the regular intervals 76.

Figure 6:
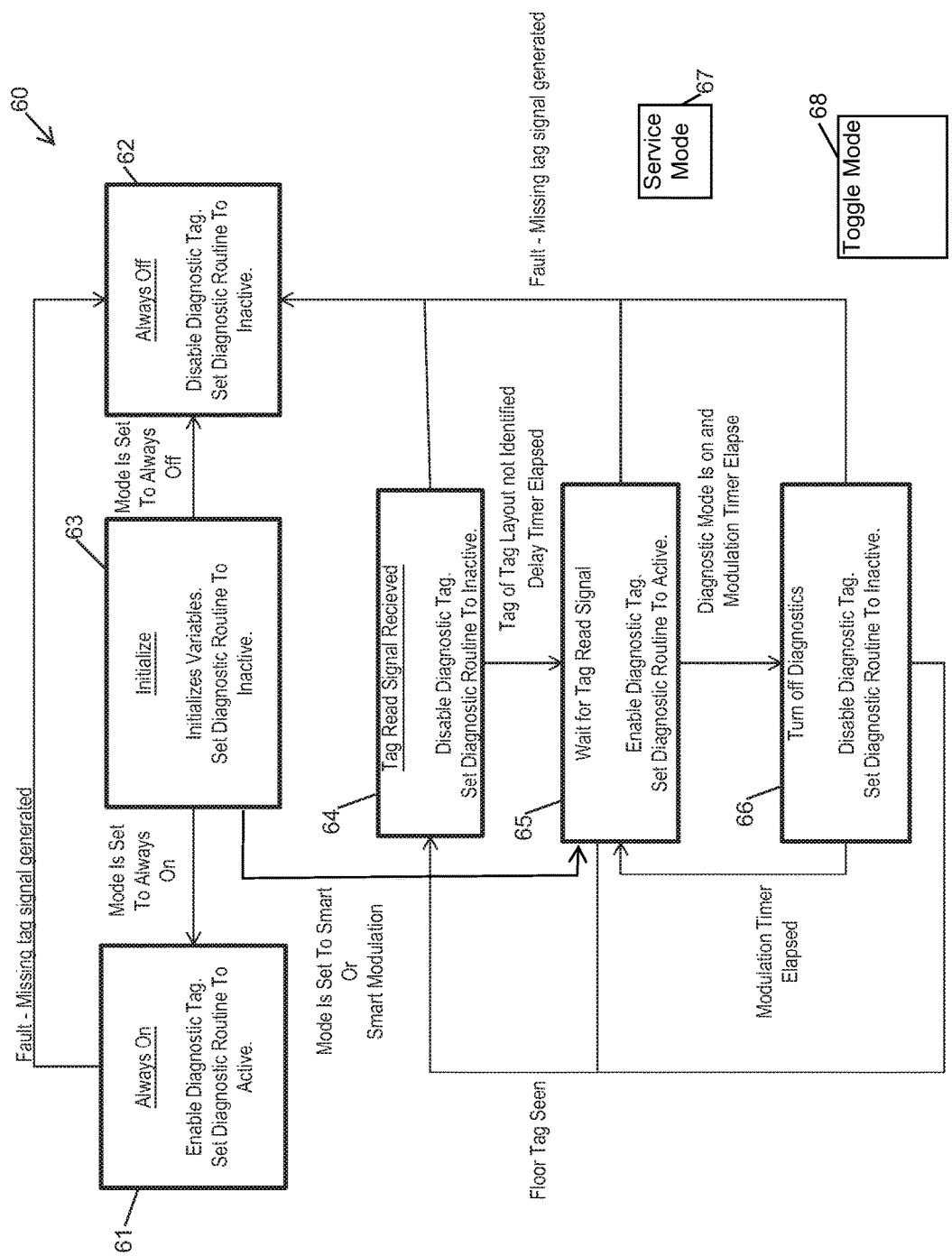
FIG. 6 depicts a flowchart illustrating a diagnostic tag modulation routine according to one or more embodiments shown and described herein.

FIG. 6 depicts a diagnostic routine 60. The diagnostic routine 60 begins in an initialize 63 state and initialize state machine variables and start the diagnostic tag modulation routine 50 (FIG. 3). Once variables and the tag readers are initialized, the diagnostic tag modulation routine 50 is set to inactive 54. Once the variables are initialized, the diagnostic routine 60 is transitioned to one of three states: a wait 65 state; an always on 61 state; or an always off 62 state. In the always on 61 state, the diagnostic tag is enabled (i.e., powered) and the diagnostic tag modulation routine 50 (FIG. 4) is set to active 53 (FIG. 4) and always on 71 (FIG. 5) mode. It is contemplated that the diagnostic routine 60 will stay in the always on 61 state until either a fault is identified or the industrial vehicle is shut down. If a fault is identified in the always on 61 state with the RFID system, the diagnostic routine 60 will transition to an always off 62 state. In the always off 62 state, diagnostic tag modulation routine 50 is transitioned to the inactive 54 (FIG. 4) state, the diagnostic tag is disabled (i.e., powered disconnected from the diagnostic tag), and the diagnostic mode 70 is transitioned to the always off 74 (FIG. 5) mode. A missing tag signal is generated when the diagnostic routine 60 transitions to the always off 62 state unless it is transitioned to the always off 61 state from the initialize 63 state. If neither the always on 61 state nor the always off 62 state are chosen, the diagnostic routine 60 transitions to the wait 65 state to wait for a tag read signal.

The missing tag signal is generated when a fault is identified by the diagnostic routine 60. A fault includes, but is not limited to, signal parity, attenuation, serial faults, tag reader faults, and other types of system degradation or errors which may affect system operation and performance of the RFID system. In other words, the reader module is checking to see if a tag read signal is generated upon the tag reader's identification of the diagnostic tag and/or if the receipt of the diagnostic signal from the diagnostic tag is degraded, exhibits any signal parity or attenuation issues, or is otherwise not within specific operating parameters. Operating parameters include, but are not limited to, received signal strength of the received diagnostic signal, signal delay between transmission of the received signal by the diagnostic tag and receipt of the received signal by the tag reader, waveform shape of the received signal, signal parity, signal attenuation, or combinations thereof.

A tag read signal generated by the tag readers, which is not derived from the diagnostic tag, is indicative that the tag readers are within a read range of a tag of the tag layout and are identifying 64 that tag of the tag layout. When a tag is identified 64, the diagnostic tag is disabled, the diagnostic tag modulation routine 50 is transitioned to the inactive 54, and the diagnostic mode 70 is transitioned to the always off 62 mode. A delay timer may be used for a quantity of time (i.e., delay time) after a tag read signal is generated to wait and identify if another tag read signal is generated by the tag readers for another tag of the tag layout. It is contemplated that the delay timer may be started after a tag read signal generated by the tag readers subsequently stops due to the tag of the tag layout lying outside the read range of the tag readers. In other words, as the industrial vehicle moves within the read range of a tag of the tag layout, the tag readers generate the tag read signal for the duration of time the tag of the tag layout is identified. However, once the industrial vehicle moves beyond the read range of the tag of the tag layout, the tag read signal ceases or is no longer generated and the delay timer is started. It is contemplated that the quantity of time of the read interval 75 (FIG. 5) is defined by how may tag read signals are generated and the subsequent delay timer.

Once the delay timer elapses, the diagnostic routine 60 will transition to the wait 65 state for the next tag read signal to be generated by the tag readers. In the wait 65 state, the diagnostic tag is enabled, the diagnostic tag modulation routine 50 is transitioned to active 53, and the diagnostic mode 70 is set to the smart modulation mode 73. In the wait 65 state, a modulation timer is used for a quantity of time (i.e., modulation time) to wait and see if a tag read signal is generated for a tag of the lag layout. If a tag read signal is generated in the wait 65 state, the diagnostic routine 60 is transitioned to the identify 64 state. It is contemplated that the quantity of time of the regular interval 76 (FIG. 5) is defined by how may tag read signals are generated and the subsequent delay timer. It is in the wait 65 state and the always on 61 state in which the reader module is looking for a fault in the RFID system through the use of the diagnostic tag.

If a tag read signal is not generated in the wait 65 state and the modulation timer elapses, the diagnostic routine 60 transitions to a turn off diagnostics 66 state. In the turn off diagnostics 66 state, the diagnostic tag is disabled, the diagnostic tag modulation routine 50 is transitioned to inactive 54, the diagnostic mode 70 is transitioned to either the smart mode 72 or the smart modulation mode 73 (FIG. 5) to look for a tag and the modulation timer is reset and started again. In the turn off diagnostics 66 state, it is contemplated that either the industrial vehicle is in a location where there aren't any tags of the tag layout or that something has changed in the system such that the diagnostic tag is the only tag for which a tag read signal is generated. The turn off diagnostics state 66 allows the tag reader and reader module to identify outside factors that may lead to a misidentification of a fault. If the modulation timer elapses, the diagnostic routine 60 is transitioned to the wait 65 state. If a tag read signal is generated for a tag of the tag layout during the turn of diagnostics 66 state, the diagnostic routine 60 is transitioned to the identify 64 state.

If a fault is identified in the identify 66, wait 65, or turn off diagnostic 66 state, the diagnostic routine 60 is transitioned to the always off 62 state. In the always off 62 state and in the fault state 55 (FIG. 4), a missing tag signal is generated. For example, and not by way of limitation, if the reader module identifies a fault in the received diagnostic signal, the generated tag read signal, or does not identify the diagnostic tag, the reader module will stop the diagnostic routine 60 and generate a missing tag signal. Examples of faults include, but not limited to, serial communication degradation or failure, tag reader degradation or failure, or a modulation or delay timer exceeds a count threshold waiting for the diagnostic tag to transmit its signal or a generated tag read signal.

It is contemplated that when the missing tag signal is generated, the vehicle controller 40 (FIG. 1) may reduce a traveling speed of the vehicle drive mechanism 25 (FIG. 1) to zero. In other words, it is contemplated that when a missing tag signal is generated, the vehicle controller 40 will bring the industrial vehicle 10 to a stop. The vehicle controller 40 may transition the vehicle drive mechanism 25 to neutral after bringing the industrial vehicle 10 to a stop. To clear the fault state, a user, may be required, using a user interface, to transition the vehicle drive mechanism 25 from neutral. For example, and not by limitation, the user of the industrial vehicle 10 may need to manually control the industrial vehicle 10 as automatic functionality is disabled while the missing tag signal is generated.

In one embodiment, the diagnostic routine 60 comprises a toggle mode 68 and a service mode 67. The toggle mode 68 enables the diagnostic routine 60 to switch diagnostic testing between two or more read antennas such that only one read antenna is enabled at a time. In other words, the diagnostic routine 60 will look for a fault with a first antenna and then look for a fault with a second antenna. For example, and not by way of limitation, if the industrial vehicle comprises two tag readers, each with a respective diagnostic tag, the diagnostic routine 60 will look for and identify any problems with the tag read signal and the receipt of the diagnostic signal of the first tag reader while the second tag reader is disabled. Once testing of the first tag reader is accomplished, the first tag reader is disabled and the second tag reader is enabled and tested. It is contemplated that the toggle mode is used in the wait 65 state and the always on 61 state.

The service mode 67 enables the diagnostic routine 60 to go through its steps without generating a missing tag signal and faulting the industrial vehicle. This may be advantageous when the industrial vehicle is being serviced such that the RFID system can be tested without placing the industrial in a fault. An indication may be given on a user interface that the diagnostic routine 60 identified a fault without the generation of the missing tag signal.

It is contemplated that the embodiments described herein are not limited to only an industrial vehicle and may be used with many RFID devices. For example, and not by way of limitation, non-vehicular RFID devices include a handheld RFID device (see FIG. 7A), RFID security systems (see FIG. 7B), an RFID entry reader (see FIG. 7C), and the like, none of which are limited in use to detection of individual tags that form a tag layout in an environment such as a building, warehouse, or industrial facility, as described above. In one embodiment and referring to FIG. 7A, the RFID system 90 comprises a diagnostic tag 45 and a hand-held, or otherwise portable, RFID reader 91 that may, for example, be used to read an RFID tag affixed to or embedded in an inventory item for inventory tracking, an RFID tag affixed to or embedded in a permanent or movable structure as a means of identification, an RFID tag secured to an individual or animal for tracking and/or identification, etc. In some embodiments, an RFID tag to be read is functionally combined with an environmental sensor, and the tag and sensor cooperate to provides information regarding the environment in which the tag is situated, when the tag is read. For example, an RFID tag, integrated with a temperature sensor, and attached to a perishable inventory item, such as a meat or diary product, could provide historical temperature data of the perishable product to help ensure that the product has been kept at a proper temperature over time. Regardless of the particular functionality associated with an RFID tag to be read, the diagnostic tag 45 is coupled to the RFID reader 91 within a read range R of an antenna 33 of the RFID reader 91. A fault in the RFID system 90 may be indicated by a flashing light 95, an audible tone from a sound device 96, a visual alert on a display of the RFID reader, and/or disabling the RFID reader 91 until repairs or made or reset. In one embodiment and referring to FIG. 7B, the RFID system 90 comprises one or more diagnostic tags 45 and one or more RFID gates 92. Each diagnostic tag 45 is coupled to RFID gates 92 within a read range R of each antenna 33 of each RFID gate 92. A fault in the RFID system 90 may be indicated by one or more flashing lights 95, an audible tone from one or more sound devices 96, and/or disabling the RFID gates 92 until repairs or made or reset. In one embodiment and referring to FIG. 7C, the RFID system 90 comprises a diagnostic tag 45 and a RFID entry reader 93. The diagnostic tag 45 is coupled to the RFID entry reader 93 within a read range R of an antenna 33 of the RFID entry reader 93. A fault in the RFID system 90 may be indicated by a flashing light 95, an audible tone from a sound device 96, and/or disabling the RFID entry reader 93 until repairs or made or reset.

The present disclosure presents an apparatus and a process to confirm the operational status of a RFID system. The apparatus and process are used to check for a fault which include, but is not limited to, signal parity, attenuation, serial faults, tag reader faults, and other types of system degradation or errors which may affect system operation and performance of the RFID system. A missing tag signal is generated if a fault is identified. A diagnostic tag may be mounted within a signal range of an antenna of a tag reader and used to provide an end-to-end test of the RFID system. The diagnostic tag may be configured to operate in one of several modes so that the diagnostic tag does not interfere with the operation of the RFID system when identifying tags in an environment. A diagnostic routine may be used if the tag readers no longer identify tags of a tag layout to check the operation of the system or routinely during operation to shutdown the industrial vehicle upon an identified fault.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that recitations herein of "at least one" component, element, etc., or "one or more" component, element, etc., should not be used to create an inference that the alternative use of the articles "a" or "an" should be limited to a single component, element, etc.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

The phrase "communicably coupled" means that components are capable of exchanging data signals with one another such as, for example, electrical signals via conductive medium, electromagnetic signals via air, optical signals via optical waveguides, and the like.

It is noted that, while the functions are enumerated and depicted as being performed in a particular sequence in the depicted embodiment, the functions can be performed in an alternative order without departing from the scope of the present disclosure. It is furthermore noted that one or more of the functions can be omitted without departing from the scope of the embodiments described herein.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An industrial vehicle comprising:
   a steering mechanism;
   a vehicle drive mechanism;
   a tag reader;
   a reader module; and
   a diagnostic tag, wherein
   the diagnostic tag is positioned on the industrial vehicle within a read range R of the tag reader such that the tag reader is responsive to the diagnostic tag,
   the tag reader is further responsive to individual tags of a tag layout positioned in the vicinity of the industrial vehicle within the read range R of the tag reader,
   the reader module discriminates between the diagnostic tag and the individual tags of the tag layout,
   the reader module correlates an identified individual RFID tag of the tag
   layout with tag data and the diagnostic tag with operation of the tag reader, and
   power to the diagnostic tag is disabled for a read interval when the tag reader receives a tag read signal indicative of another tag in the tag layout.

2. The industrial vehicle of claim 1, wherein the reader module modulates power to the diagnostic tag such that the diagnostic tag is inactive during identification of the individual tags of the tag layout.

3. The industrial vehicle of claim 1, wherein:
   the industrial vehicle comprises two or more diagnostic tags;
   the tag reader comprises two or more read antennas;
   each read antenna comprises a read range;
   each individual diagnostic tag is within the read range of an individual read antenna;

each read antenna generates a tag read signal upon receiving a diagnostic signal transmitted by the individual diagnostic tag within its respective read range; and the reader module discriminates between read antennas, and generates a missing tag signal if one of the read antennas does not generate a tag read signal corresponding to the diagnostic tag within its respective read range or the tag reader is not operating within specified operating parameters.

4. The industrial vehicle of claim 3 wherein the reader module toggles between each read antenna such that only one read antenna is enabled at a time to identify if the read antenna does not generate a tag read signal corresponding to the diagnostic tag within its respective read range or the tag reader is not operating within specified operating parameters.

5. The industrial vehicle of claim 1 wherein:
the diagnostic tag comprises a passive radio frequency identification (RFID) tag;
the passive RFID tag comprises an antenna circuit and a data chip; and
the reader module modulates power to the diagnostic tag such that power is applied to the antenna circuit during the identification of the individual tags to disable the passive RFID tag.

6. The industrial vehicle of claim 1 wherein:
the diagnostic tag comprises an active radio frequency identification (RFID) tag;
the active RFID tag comprises an antenna circuit, a data chip, and a power circuit; and
the reader module modulates power to the diagnostic tag such that power is removed from the power circuit during the identification of the individual tags to disable the active RFID tag.

7. The industrial vehicle of claim 1 wherein the operating parameters comprise received signal strength of the received diagnostic signal, signal delay between transmission of the received diagnostic signal by the diagnostic tag and receipt of the received diagnostic signal by the tag reader, waveform shape of the received diagnostic signal, signal parity, signal attenuation, or combinations thereof.

8. The industrial vehicle of claim 3 wherein the generation of the missing tag signal brings the industrial vehicle to a stop.

9. The industrial vehicle of claim 1 wherein the reader module executes a diagnostic routine to identify a fault when the tag reader fails to generate a tag read signal in the diagnostic routine or when a diagnostic signal from the diagnostic tag is not within specified operating parameters.

10. The industrial vehicle of claim 9 wherein the specified operating parameters comprise received signal strength of the received diagnostic signal, signal delay between transmission of the received signal by the diagnostic tag and receipt of the received signal by the tag reader, waveform shape of the received signal, signal parity, signal attenuation, or combinations thereof.

11. The industrial vehicle of claim 9 wherein the fault is indicated by a flashing light, an audible tone from a sound device, disabling the RFID reader, or combinations thereof.

12. The industrial vehicle of claim 9 wherein the fault is indicated by a visual alert on a display of the RFID reader.

13. A method for identifying a fault in a RFID system of an industrial vehicle, the RFID system comprising a tag reader, a diagnostic tag, and a reader module, the method comprising:

initializing the tag reader;
identifying the diagnostic tag positioned on the industrial vehicle and individual tags of a tag layout through the cooperation of the tag reader and reader module;
enabling the diagnostic tag;
modulating power to the diagnostic tag such that the diagnostic tag does not interfere with the identification of the individual tags of the tag layout;
maintaining power to the diagnostic tag such that the diagnostic tag transmits a diagnostic signal at regular intervals when in an always on mode;
discriminating between the diagnostic tag and the individual tags of the tag layout; and
correlating an identified individual RFID tag of the tag layout with tag data and the diagnostic tag with operation of the tag reader.

14. The method of claim 13 comprising generating a missing tag signal if the diagnostic tag is not identified while it is enabled or the operation of the tag reader is not within specified operating parameters.

15. The method of claim 13 comprising:
generating a tag read signal for the duration of identification of the individual tag of the tag layout;
starting a delay timer upon cessation of the generation of the tag read signal; and
enabling the diagnostic tag after a delay time elapses.

16. The method of claim 13 further comprising:
modulating power to the diagnostic tag in one of four diagnostic modes comprising the always on mode, a smart mode, a smart modulation mode, and an always off mode such that the diagnostic tag does not interfere with the identification of the individual tags of the tag layout; and
disabling or removing power to the diagnostic tag such that the diagnostic tag does not transmit a diagnostic signal when in the always off mode.

17. The method of claim 16 further comprising disabling or removing power to the diagnostic tag for a read interval when the tag reader receives a tag read signal indicative of another tag in the tag layout when in the smart mode.

18. The method of claim 16 further comprising disabling or removing power to the diagnostic tag for a read interval when the tag reader receives a tag read signal indicative of another tag in the tag layout, and for addition periodic, regular intervals to search for one or more tag read signals from one or more other tags, when in the smart modulation mode to prevent or reduce the likelihood of masking the one or more tag read signals from the one or more other tags.

19. The industrial vehicle of claim 1 further comprising:
modulating power to the diagnostic tag in one of four diagnostic modes comprising an always on mode, a smart mode, a smart modulation mode, and an always off mode such that the diagnostic tag does not interfere with the identification of the individual tags of the tag layout;
maintaining power to the diagnostic tag such that the diagnostic tag transmits a diagnostic signal at regular intervals when in the always on mode; and
disabling or removing power to the diagnostic tag such that the diagnostic tag does not transmit a diagnostic signal when in the always off mode;
wherein power to the diagnostic tag is disabled for the read interval in response to the tag reader receiving the tag read signal indicative of another tag in the tag layout when the diagnostic tag is in the smart mode.

20. A method for identifying a fault in a RFID system of an industrial vehicle, the RFID system comprising a tag reader, a diagnostic tag, and a reader module, the method comprising:
  initializing the tag reader;
  identifying the diagnostic tag positioned on the industrial vehicle and individual tags of a tag layout through the cooperation of the tag reader and reader module;
  enabling the diagnostic tag;
  modulating power to the diagnostic tag such that the diagnostic tag does not interfere with the identification of the individual tags of the tag layout;
  disabling power to the diagnostic tag for a read interval when the tag reader receives a tag read signal indicative of another tag in the tag layout when the diagnostic tag is in a smart mode;
  discriminating between the diagnostic tag and the individual tags of the tag layout; and
  correlating an identified individual RFID tag of the tag layout with tag data and the diagnostic tag with operation of the tag reader.

21. The method of claim 20 further comprising:
  generating a missing tag signal if the diagnostic tag is not identified while it is enabled or the operation of the tag reader is not within specified operating parameters.

22. The method of claim 20 comprising:
  generating a tag read signal for the duration of identification of the individual tag of the tag layout;
  starting a delay timer upon cessation of the generation of the tag read signal; and
  enabling the diagnostic tag after a delay time elapses.

23. The method of claim 20 further comprising:
  modulating power to the diagnostic tag in one of four diagnostic modes comprising an always on mode, the smart mode, a smart modulation mode, and an always off mode such that the diagnostic tag does not interfere with the identification of the individual tags of the tag layout;
  maintaining power to the diagnostic tag such that the diagnostic tag transmits the diagnostic signal at regular intervals when in the always on mode; and
  disabling or removing power to the diagnostic tag such that the diagnostic tag does not transmit a diagnostic signal when in the always off mode.

24. The method of claim 23 further comprising:
  disabling or removing power to the diagnostic tag for the read interval when the tag reader receives the tag read signal indicative of another tag in the tag layout, and for addition periodic, regular intervals to search for one or more tag read signals from one or more other tags, when in the smart modulation mode to prevent or reduce the likelihood of masking the one or more tag read signals from the one or more other tags.

* * * * *